United States Patent
Neckel

(10) Patent No.: US 6,274,864 B1
(45) Date of Patent: Aug. 14, 2001

(54) MECHANICAL DELIMITATION OF THE TOLERANCES OF AN OPTICAL TRANSMISSION SECTION

(75) Inventor: Klaus Neckel, Vaihingen (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/230,186

(22) PCT Filed: Jul. 15, 1997

(86) PCT No.: PCT/EP97/03765

§ 371 Date: Apr. 5, 1999

§ 102(e) Date: Apr. 5, 1999

(87) PCT Pub. No.: WO98/03838

PCT Pub. Date: Jan. 29, 1998

(30) Foreign Application Priority Data

Jul. 18, 1996 (DE) .............................. 196 29 005

(51) Int. Cl.⁷ .................................................. G01D 5/34
(52) U.S. Cl. ................. 250/231.13; 250/231.14
(58) Field of Search ........................ 250/231.13, 231.14, 250/231.16, 231.17, 231.18, 229; 341/3, 13; 356/614, 616, 617

(56) References Cited

U.S. PATENT DOCUMENTS

| | | |
|---|---|---|
| 4,096,383 | 6/1978 | Mancini et al. . |
| 4,658,133 | 4/1987 | Nishiura . |
| 5,837,999 | * 11/1998 | Horiuchi .......................... 250/231.14 |
| 6,184,518 | * 2/2001 | Klein ............................. 250/231.13 |

FOREIGN PATENT DOCUMENTS

| | | |
|---|---|---|
| 83 32 203 | 11/1983 | (DE) . |
| 34 38 461 | 10/1984 | (DE) . |
| 38 09 569 | 3/1988 | (DE) . |
| 38 09 804 | 3/1988 | (DE) . |
| 40 06 683 | 3/1990 | (DE) . |
| 42 43 778 | 12/1992 | (DE) . |
| 0 036 976 | 10/1981 | (EP) . |
| 0 184 769 | 6/1986 | (EP) . |
| 0 232 625 | 8/1987 | (EP) . |
| 2 156 990 | 6/1973 | (FR) . |

* cited by examiner

Primary Examiner—John R. Lee
Assistant Examiner—Kevin Pyo
(74) Attorney, Agent, or Firm—J. Gordon Lewis

(57) ABSTRACT

The invention concerns a scanning device which scans a code disc by means of a subassembly comprising a radiation emitter and a radiation receiver. The object of the invention is to emulate the length ratio of the tooth to the tooth space by the ratio, on the output side, of pulses to interpulse periods without using complicated regulating devices. To that end, when the operating voltage for the assembly is at the maximum permissible level, the ratio of the teeth to the tooth spaces on the code carrier is to be adapted such that, on the output side, the ratio of pulses to interpulse periods is 1:1.

5 Claims, 2 Drawing Sheets

MECHANICAL DELIMITATION OF THE TOLERANCES OF AN OPTICAL TRANSMISSION SECTION

BACKGROUND OF THE INVENTION

The invention pertains to an optical scanning device, in particular, for steering angle sensors. Scanning devices of this type contain a code carrier with toothed segments distributed over its length or periphery. These segments are irradiated by a radiation transmitter arranged in front of the toothed segments, and the radiation which passes through the intermediate spaces between the segments is measured with a receiver arranged behind the toothed segments.

It is frequently desired that the output signal of the receiver have a certain ratio between pulses and interpulse periods, e.g., a ratio of 1:1. This can only be achieved by utilizing a pulse shaper. A pulse shaper converts the output signals of a receiving photodiode into square-wave signals at the output of the receiver. In order to achieve a certain ratio between the pulses and the interpulse periods at the output, the transmission voltage can be changed such that the radiation level is reduced and a chronological shift of the response threshold of the converter is attained on the reception side. Another option consists of changing the response threshold on the reception side such that the beginning and the end of the respective output pulses can be controlled. However, both of the aforementioned measures are expensive and require a complicated control arrangement.

SUMMARY OF THE INVENTION

The invention is based on a scanning device and aims to achieve a predetermined scanning ratio on the output side with simple means. The invention, in principle, consists of selecting a relatively high value for the transmission current such that the phototransistor operates near the saturation point. Due to this measure, the transmission side of the scanning device is less sensitive to current or voltage fluctuations and radiation originating from the environment. Due to the increased transmission current, the scanning ratio on the output side is changed while the response threshold of the receiver remains the same. If it is not intended to change the response threshold, which is designed for the highest possible sensitivity, the invention proposes to change the length ratio between the teeth and the gaps between the teeth on the code carrier in a suitable fashion. This means that, if the ratio between pulses and interpulse periods is increased on the output side by increasing the transmission current, the length of the teeth is increased on the input side and the length of the gaps between the teeth is correspondingly decreased. For example, if excessively short (positive) output pulses are obtained with a predetermined tooth length on the code carrier by utilizing an inverting circuit, the length of the teeth is correspondingly increased and the gaps between the teeth are decreased in order to increase the ratio between the output pulses (i.e., excessively long negative pulses) and the corresponding interpulse periods.

According to one additional development of the invention, a favorable ratio between pulses and interpulse periods is 1:1.

When measuring rotational angles by means of the scanning device, a particular simple design of the code carrier is defined by a toothed disk on the periphery of which permeable and impermeable regions are circularly distributed. In this case, the teeth may be circularly arranged on the edge of the disk such that they extend perpendicular to the disk.

With respect to the transmitter and the receiver, it is proposed to provide the transmitter with a phototransistor and the receiver with a photodiode.

BRIEF DESCRIPTION OF THE DRAWING

One embodiment of the invention is described below with reference to the figures. The figures show.

DESCRIPTION OF THE PREFERRED EMBODIMENT

Figure 1A:
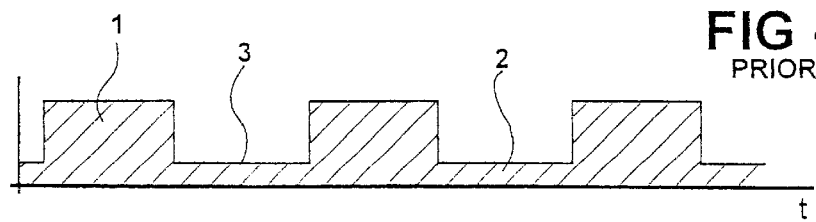
FIGS. 1a, 1b, and 1c depict the design of the teeth of a prior art code disk and the signals resulting thereof at the output of the diode and the output of the converter.
Figure 1B:
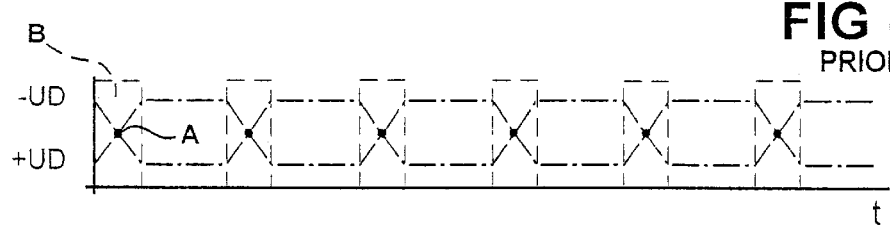
Figure 1C:
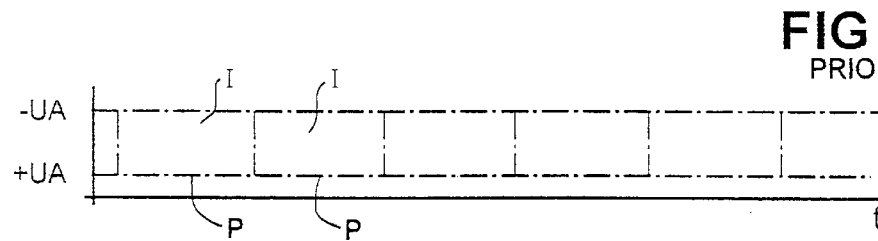
Figure 2A:
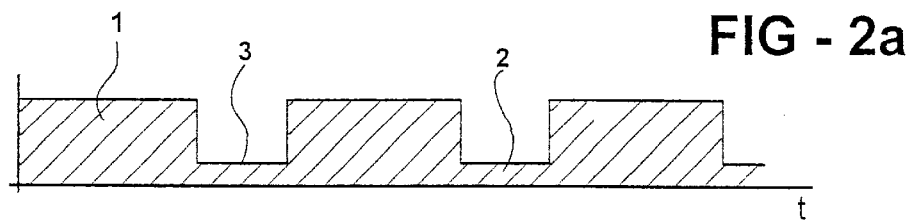
FIGS. 2a, 2b, and 2c depict the teeth on a code disk of the present invention and the signals resulting therefrom at the output of the diode and at the output of the converter.
Figure 2B:
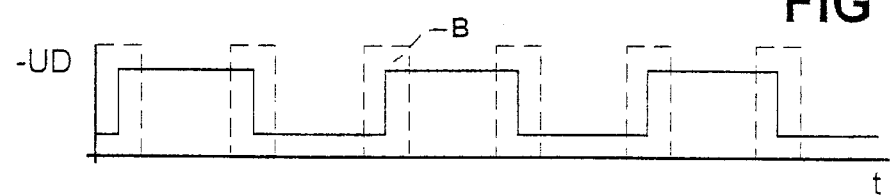
Figure 2C:
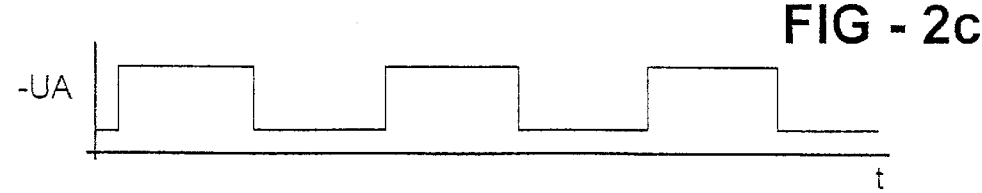
Figure 3:
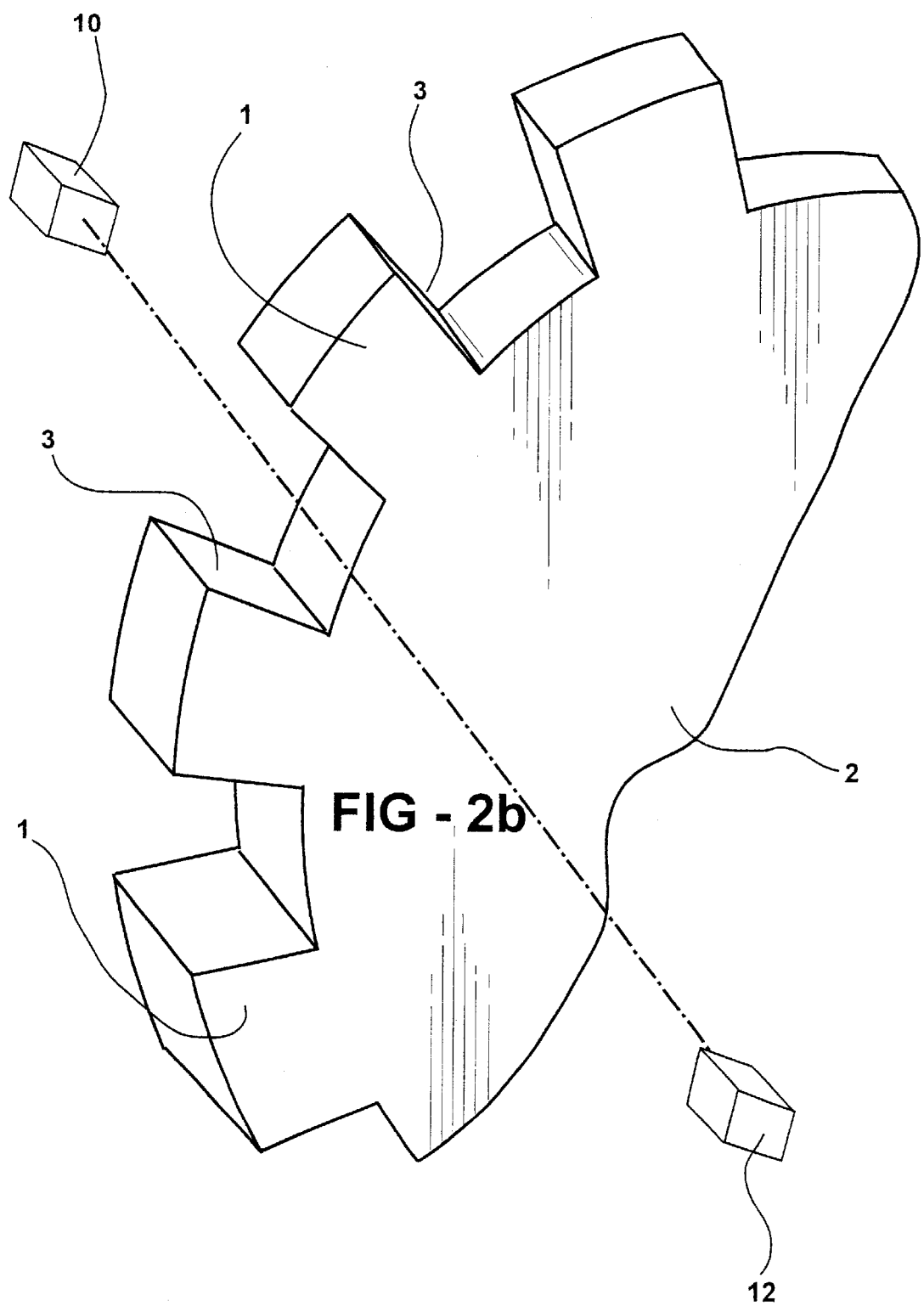
FIG. 3 is a partial perspective view of a code disk having teeth and gaps according to the present invention.

FIGS. 1a and 3 show a sectional representation and a partial perspective view of teeth 1 arranged on the edge of a generally known, prior art code disk 2. The teeth 1 represent regions that are impermeable to radiation and the gaps 3 between the teeth, represent regions that are permeable to the radiation that is emitted by a phototransistor 10 and measured on the reception side by a photodiode 12. At the output of the diode 1e, a voltage of +UD results, wherein a voltage –UD results if an inversion circuit is used, see FIG. 1b. With respect to the already proposed circuit, it is important that, when reaching the trigger threshold A according to FIG. 1b the not-shown converter begins or concludes a corresponding pulse (see the waveform in FIG. 1c) due to the output voltage of the diode 12, namely, depending on whether an inversion element is used or not. The respective length of the pulse I or the interpulse period of the voltages at the output of the receiver (–UA for an inverting circuit and +UA for a noninverting circuit) depends on the position of the trigger threshold A in FIG. 1b and/or the length of the tooth 1 or the gap 3 between the teeth 1 on the code disk 2 according to FIG. 1a. If it is intended to change the length ratio of the pulses I with respect to the interpulse periods P of the output signal (FIG. 1c), the response threshold can be changed by utilizing a corresponding control circuit. However, the present invention proposes a simpler method which consists of changing the ratio between the length of the teeth 1 and the gaps 3 between the teeth correspondingly as shown in FIG. 2 (see FIG. 2a). The respective sections B of FIGS. 1b and 2b also contain symbolic representations of the position of the diaphragm with reference to the code disk 2 which changes over time t. Generally speaking, only the relative movement between the teeth 1 on the code disk (see FIG. 1b) is important for generating output signals. In the figures, the change in position of the diaphragm B relative to the teeth 1 is indicated by broken lines in FIG. 1b and 2b. The position of the diaphragm, the transmitter and the receiver all of which are approximately aligned with one another, normally is stationary, whereas the teeth 1 on the code disk 2 move past the diaphragm.

FIG. 2a shows a code disk 2, in which the length of the teeth 1 was increased with respect to the gaps 3 between the teeth 1. Due to this measure, the desired ratio of 1:1 between the pulses and the interpulse periods is achieved.

Another aspect of the present invention is that the transmitter and the receiver (phototransistor 10 and photodiode 12) are components which are freely available on the market, wherein the ration between pulses and interpulse periods can be controlled on the output side by controlling the voltage applied to the respective components while a predetermined ration exists on the input side. If the voltage applied to the respective component is increased, the pulses delivered on the output side are large in comparison to the interpulse periods. If the ration between the teeth and the gaps between the teeth should correspond to the ratio between the pulses and the interpulse periods at the output of the receiver when high voltages are applied to the respective component, the length of the teeth 1 needs to be increased.

Consequently, the invention can be briefly described as follows: the optical scanning unit of a steering angle sensor (LWS) is intentionally maintained "mechanically rough". Consequently, the scanning unit can be easily manufactured and the contamination risk during operation is reduced. This means that the diaphragm is very wide due to the risk of contamination.

However, it needs to be observed that the optical scanning of the code disk (teeth and gaps) of the LWS is carried out with a diaphragm. In order to achieve a constant, exact ratio between pulses and interpulse periods (PPV), the optical path (phototransistor and photodiode) need to be operated at a certain operating point. In this case, the LED current needs to be controlled. However, this is very expensive.

According to the invention, the teeth of the code disks have such dimensions that a PPV of 50%/50% is adjusted at the maximum LED current.

In addition, one attains the following advantages. The quality of the output signal is no longer dependent on the luminous intensity (LED current) and is less sensitive to contamination. The aging of the LED also is no longer important and the serial scattering no longer needs to be compensated by means of laser compensation.

What is claimed is:

1. An optical scanning device with a code carrier that contains an alternating arrangement of regions that are permeable to radiation and regions that are impermeable to radiation, with a radiation transmitter that irradiates the permeable and impermeable regions, and with a radiation receiver that measures the radiation passing through the respective regions, wherein the output signal of the radiation receiver consists of a pulse train with a predetermined ratio between pulse length and interpulse periods, characterized by the transmitter being operated at the maximum power and the length ratios between the alternating regions on the code carrier being chosen such that the output signal of the radiation receiver reaches the predetermined length ratio.

2. The scanning device according to claim 1, characterized by the predetermined length ratio being 1:1.

3. The scanning device according to claim 1, characterized in that the code carrier is a toothed disk, on the periphery of which the regions are circularly distributed.

4. The scanning device according to claim 3, characterized in that the disk contains an annular projection which is arranged to be annular and concentric to the rotational axis of the disk, wherein the teeth are formed in the annular projection.

5. The scanning device according to claim 1, characterized in that the transmitter contains a phototransistor and the receiver contains a photodiode.

* * * * *